United States Patent [19]

Opperthauser

[11] 3,775,869

[45] Dec. 4, 1973

[54] APPARATUS FOR MANUALLY ENCODING A DATA RECORD

[75] Inventor: Calvin F. Opperthauser, New Providence, N.J.

[73] Assignee: American Telephone and Telegraph Company, New York, N.Y.

[22] Filed: May 25, 1972

[21] Appl. No.: 256,948

[52] U.S. Cl. .................... 35/48 R

[51] Int. Cl. .................... G09b 1/00

[58] Field of Search .................... 35/48 R, 48 A, 9 R, 35/74, 31 A, 35 F, 31 E

[56] References Cited

UNITED STATES PATENTS

| | | | |
|---|---|---|---|
| 2,906,037 | 9/1959 | Rubin | 35/31 A |
| 3,199,228 | 8/1965 | Rubin | 35/74 X |
| 1,161,381 | 11/1915 | Duffy | 35/31 A |
| 2,525,837 | 10/1950 | Simplair | 35/48 A X |
| 2,160,909 | 6/1939 | Ross | 35/48 A |
| 2,591,327 | 4/1952 | Witter et al. | 35/9 |
| 3,124,358 | 3/1964 | Weedman | 35/48 R X |
| 3,653,130 | 4/1972 | Geib | 35/2 |

*Primary Examiner*—Robert W. Michell
*Assistant Examiner*—J. H. Wolfe
*Attorney*—Paul M. Enlow et al. and Edwin B. Cave

[57] ABSTRACT

The apparatus comprises a base including a slot for accommodating an individual data record in a plane parallel to the upper surface thereof, and a disk rotatably mounted on the base so as to overlie the slot. The disk is divided into a multiplicity of segments, each of which includes a column of marking holes. The spacing between the marking holes in each column is the same as the spacing between rows of data locations on the data record, a first column of marking holes being located at the same distance from the axis of rotation as one of the columns of data locations on the data record when positioned within the slot in the base. Each successive column of marking holes is radially displaced from the adjacent column of marking holes a distance that corresponds to the spacing between columns of data locations on the data record.

9 Claims, 3 Drawing Figures

APPARATUS FOR MANUALLY ENCODING A DATA RECORD

FIELD OF THE INVENTION

This invention relates to data record encoding devices and within that field to apparatus for manually encoding data records having data locations arranged in columns and rows.

BACKGROUND OF THE INVENTION

In conducting interviews, surveys, and opinion polls, it is usually desirable to tabulate the individual answers obtained so that statistical data can be generated from these answers. The easiest way to do this is to encode the answer to each question directly onto a data record at the time of the interview, and then use data processing equipment to extract the information from each data record and generate the desired statistical data. The major problem with this approach is assuring that the interviewer properly encodes each data record to accurately record the answers received. The data locations on the typical data record are arranged in closely spaced columns and rows, and therefore keeping track of the row and column of the data locations corresponding to the particular answer received is a difficult matter.

DESCRIPTION OF THE INVENTION

The apparatus of the present invention facilitates the manual encoding of a data record by an individual conducting an interview.

In one embodiment, the apparatus comprises a base including a slot for locating a data record in a plane parallel to the upper surface of the base. A disk is rotatably mounted on the base so as to overlie the slot, and the disk is divided into segments. Each segment includes a column of marking holes extending perpendicular to a radius at the midpoint of the segment, the spacing between the marking holes in each column being the same as the spacing between one or more rows of data locations on the data record.

A first column of marking holes is located at the same distance from the axis of rotation as one of the columns of data locations on the data record, and each successive column of marking holes is located closer to the axis a distance that corresponds to the spacing between one or more columns of data locations. Each segment also includes an indexing hole positioned adjacent to the periphery of the disk that cooperates with a ball bearing detent mounted in the base to locate an associated column of marking holes in registration with an individual column of data locations.

Positioned on top of the disk is a circular data sheet that is divided into segments corresponding to those on the disk. Each segment on the sheet contains one or more questions and alternative responses to each question, and each response is associated with an individual marking hole in the corresponding disk segment. Thus a response is encoded by placing a pencil point into the marking hole associated with the response and scribing a circle whereby the corresponding data location in the data record is marked. After each question is answered, the disk is rotated to advance the data sheet to the next question and the responses to that question are automatically encoded in the appropriate column of data locations on the data record.

DETAILED DESCRIPTION OF THE INVENTION

Figure 1:
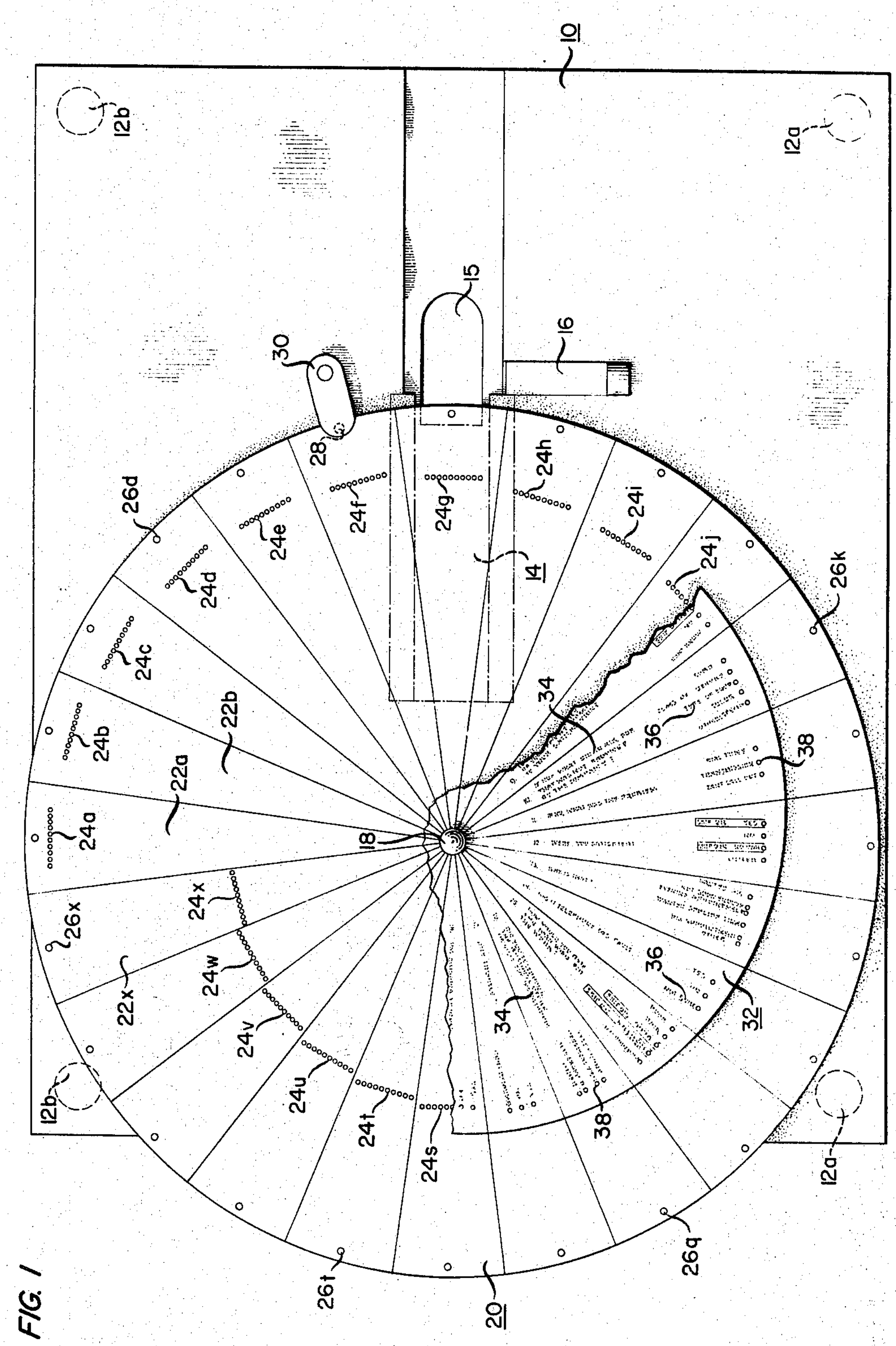
FIG. 1 is a top view of an apparatus for manually encoding a data record in accordance with this invention with portions broken away for greater clarity.

Referring to the drawing, in one specific embodiment of this invention the apparatus comprises a base 10 supported by legs 12. Front legs **12*a* are shorter than rear legs 12*b* so that when the apparatus is placed on a horizontal surface, the base 10** is inclined. The use of the apparatus is thereby facilitated.

Figure 2:
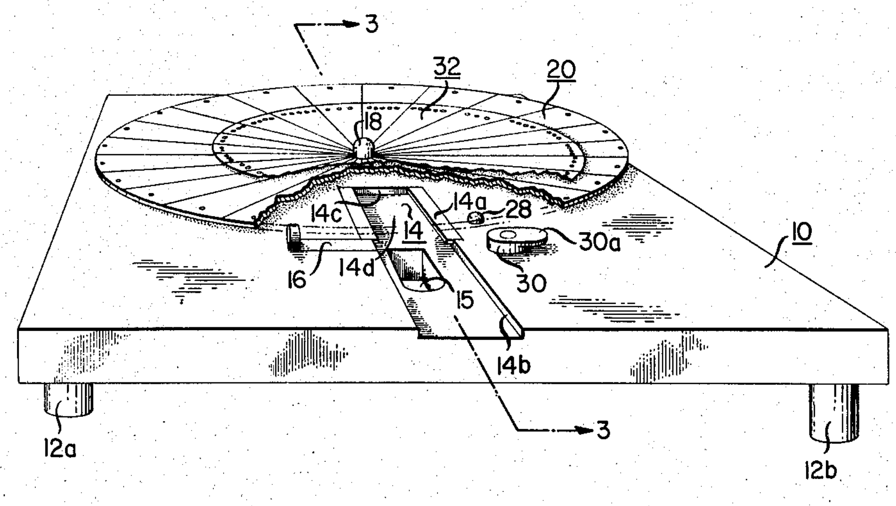
FIG. 2 is a side perspective view of the apparatus.
Figure 3:
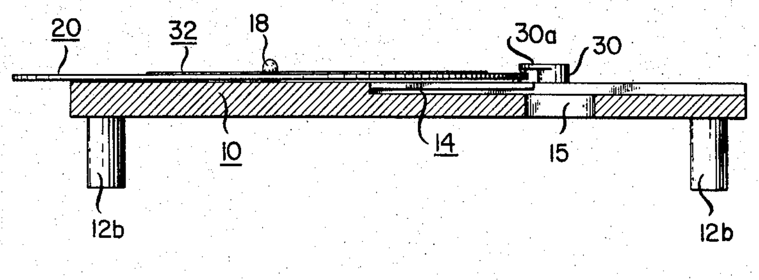
FIG. 3 is a sectional view taken along line 3—3 of FIG. 2.

As seen most clearly in FIG. 2, the base 10 includes a rectangular slot 14 for accommodating a data record having data locations arranged in columns and rows, such as the rectangular card commonly referred to as the "IBM card." The slot 14 has the same width as that of the data record accommodated thereby and includes a pair of flanges **14*a* that respectively overhang sides 14*b* of the slot, the flanges extending from closed end 14*c* of the slot for the same distance as the length of the data record. The upper surfaces of the flanges 14*a* are flush with the upper surface of the base 10, while the under surface of the overhanging portions are spaced from bottom surface 14*d* of the slot a slightly larger distance than the thickness of the data record. Thus, the slot 14** is of a length, width, and depth to closely accommodate the data record.

An opening 15 in the base 10 facilitates the insertion and removal of the data record from the slot 14, the opening extending for a short distance into the open end of the slot. In addition, a slideably displaceable lock 16 is provided for closing the open end of the slot 14 to prevent the data record from shifting after it has been inserted into the slot.

The base 10 further includes a spindle 18 on which a disk 20 is rotatably mounted. The disk 20 when positioned on the spindle 18 overlies the slot 14 and as shown in FIG. 1 the disk is divided into a multiplicity of segments **22*a* through 22*x*. Each segment includes a column of ten spaced marking holes 24 extending perpendicular to a radius at the midpoint of the segment, and the holes in each column are spaced apart the same distance as the spacing between rows of data locations on the data record. In addition, the column of marking holes 24*a* is located at the same radial distance from the axis of rotation of the disk 20, as one of the columns of data locations on the data record when the data record is positioned in the slot 14**, and each successive column of holes is radially displaced closer to the axis of rotation a distance that corresponds to the spacing between columns of data locations on the data record.

The spacing between the marking holes 24 in each column need not be the same as the distance between adjacent rows of data locations on the data record, but may be the same as the spacing between alternate rows or may even be a mixture of spacings as long as each hole corresponds to a data location in the associated column on the data record. Similarly the radial displacement between columns of marking holes 24 need not be the same as the spacing between adjacent columns of data locations so long as each column of holes corresponds to a column of data locations on the data record.

Each segment 22 of the disk 20 also includes an indexing hole 26 positioned adjacent to the periphery of the disk. Each indexing hole 26 is located the same radial distance from the axis of rotation as a spring-loaded ball bearing detent 28 mounted in the base 10 and is of a size to accommodate a portion of the ball bearing. In addition, the detent 28 is located so that when an indexing hole 26 is in engagement therewith and a data record is in place in the slot 14, the column of marking holes 24 in the adjacent segment 22 is positioned in registration with the associated column of data locations on the data record.

A hold-down 30 serves to both hold the disk 20 on the spindle 18 and assure interaction between the indexing holes 26 and the detent 28. The hold-down 30 is pivotally mounted on the base 10 adjacent to the detent 28 and it includes a lip 30*a* that is of a length to overlie the disk 20 when the hold-down is rotated to extend normal to the circumference of the disk. The lip 30*a* includes means (not shown) for making rolling contact with the upper surface of the disk 20 and preventing the detent 28 from deflecting the disk upwardly.

A circular data sheet 32 is positioned on top of the disk 20, the sheet being divided into segments corresponding to those of the disk. Each segment of the sheet contains a question 34 and alternative responses 36 to the question, and each response is associated with an individual template hole 38 that is in registration with one of the marking holes 24 in the corresponding disk segment 22.

In the operation of the apparatus of this invention, a data record is inserted into the slot 14 in the base 10 and locked into place by moving the slide lock 16 into engagement with the opposing side of the slot. The disk 20 is then rotated so that segment 22a overlies the data record, the detent 28 engaging the indexing hole 26*x* to accurately locate the marking holes 24*a* in registration with a column of data locations on the data record. The interviewer then asks the question 35 on the data sheet 32 associated with the segment 22*a* and encodes the response received to the question by placing a pencil point into the template hole 38 and thereby the marking hole 24 associated with the response and scribing a circle, whereby the corresponding data location on the data record is marked.

The interviewer thereafter rotates the disk 20 in a counter-clockwise direction causing the ball bearing detent 38 to be deflected downwardly out of the indexing hole 26*a* and to roll along the under surface of the disk. Rotation of the disk 20 continues until the indexing hole 26*a* moves into registration with the detent 38, whereupon the ball bearing snaps upwardly into engagement with the hole. The column of marking holes 24*b* is thereupon placed in registration with another column of data locations on the data record, and the interviewer can proceed to ask the question 34 associated with segment 22*b*. The interviewer is thereby assured that the proper data locations on the data record are encoded in accordance with the answers received to each question.

While in the embodiment herein described a data sheet 32 has been employed, the questions 34 and the alternative answers 36 may be printed directly on the disk 20. This and other modifications may be made without departing from the spirit and scope of this invention as defined in the appended claims.

What is claimed is:

1. An apparatus for manually encoding a data record having data locations arranged in columns and rows on a face thereof, the apparatus comprising:

a base including a slot for accommodating an individual data record and locating the data record so that its face is exposed to an upper surface of the base, the base further including means for preventing the shifting of the data record once it is inserted into the slot; and a disk rotatably mounted on the base and overlying the slot in the base, the disk being divided into a multiplicity of segments, each segment including a column of spaced marking holes extending transverse to the segment radius, the spacing between the marking holes in each column being the same as the spacing between rows of data locations on the data record, a first column of marking holes being located at the same distance from the axis of rotation as one of the columns of data locations on the data record when the data record is positioned within the slot in the base, and each successive column of marking holes being radially displaced from the next adjacent column of marking holes a distance that corresponds to the spacing between columns of data locations on the data record, whereby each column of marking holes is associated with a unique column of data locations.

2. An apparatus as in claim 1 wherein each column of marking holes extends perpendicular to a radius of the segment in which it is situated.

3. An apparatus as in claim 1 wherein each column of marking holes extends perpendicular to a radius at the midpoint of the segment in which it is situated.

4. An apparatus as in claim 1 wherein the base further includes an opening adjacent to an open end of the slot for insertion or removal of the data record.

5. An apparatus as in claim 1 further including a detent and each segment of the disk includes an indexing hole that cooperates with the detent to position an associated column of marking holes in registration with an individual column of data locations on a data record positioned within the slot in the base.

6. An apparatus as in claim 1 further including a data sheet positioned on top of the disk, the data sheet being divided into segments corresponding to those on the disk, each segment on the data sheet containing a question and alternative responses to the question, and each response being associated with an individual marking hole in the corresponding disk segment.

7. An apparatus for manually encoding a data record having data locations arranged in columns and rows on a face thereof, the apparatus comprising:

a base including a slot for accommodating an individual data record and locating the data record so that its face is exposed to an upper surface of the base, the base further including a detent and means for preventing the shifting of the data record once it is inserted into the slot; and a disk rotatably mounted on the base and overlying the slot and detent in the base, the disk being divided into a multiplicity of segments, each segment including a column of spaced marking holes extending perpendicular to a radius at the midpoint of the segment, the spacing between marking holes in each column being the same as the spacing between rows of data locations on the data record, a first column of marking holes being located at the same distance from the axis rotation as one of the columns of data locations on the data record when the data record is positioned within the slot in the base, each successive column of marking holes being radially displaced from the adjacent column of marking holes a distance that corresponds to the spacing between columns of data locations on the data record, whereby each column of marking holes is associated with a unique column of data locations, each segment of the disk further including an indexing hole that cooperates with the detent to position an associated column of marking holes in registration with an individual column of data locations on the data record positioned within the slot in the base.

8. An apparatus as in claim 7 wherein the base further includes an opening adjacent to an open end of the slot for insertion or removal of the data record.

9. An apparatus as in claim 7 further including a data sheet positioned on top of the disk, the data sheet being divided into segments corresponding to those on the disk, each segment on the data sheet containing a question and alternative responses to the question, and each response being associated with an individual marking hole in the corresponding disk segment.

* * * * *